(12) United States Patent  
Oh

(10) Patent No.: US 6,595,875 B1  
(45) Date of Patent: Jul. 22, 2003

(54) GOLF BALL

(76) Inventor: Chae Y. Oh, 952 Bay Pointe Way SW., Lilburn, GA (US) 30047

( * ) Notice: Subject to any disclaimer, the term of this patent is extended or adjusted under 35 U.S.C. 154(b) by 0 days.

(21) Appl. No.: 10/091,145

(22) Filed: Mar. 4, 2002

(51) Int. Cl.$^7$ .................................................. A63B 37/06
(52) U.S. Cl. ........................................ 473/374; 473/373
(58) Field of Search ............................... 473/351, 355, 473/370, 371, 372, 373, 374, 375

(56) References Cited

U.S. PATENT DOCUMENTS

| | | | | |
|---|---|---|---|---|
| 743,105 | A | * 11/1903 | Roger | 473/355 |
| 1,870,862 | A | * 8/1932 | McKinnon | 473/364 |
| 2,376,084 | A | * 5/1945 | Radford | 473/373 |
| 3,271,119 | A | * 9/1966 | Woodberry | 428/613 |
| 4,714,253 | A | 12/1987 | Nakahara et al. | 273/228 |
| 5,104,126 | A | 4/1992 | Gentiluomo | 273/228 |
| 5,273,286 | A | * 12/1993 | Sun | 473/373 |
| 5,823,889 | A | 10/1998 | Aoyama | 473/374 |
| 5,961,401 | A | * 10/1999 | Masutani et al. | 473/374 |
| 5,984,805 | A | 11/1999 | Maruko | 473/354 |
| 5,984,806 | A | * 11/1999 | Sullivan et al. | 473/373 |
| 6,162,134 | A | 12/2000 | Sullivan et al. | 473/373 |
| 6,186,906 | B1 | * 2/2001 | Sullivan et al. | 473/351 |
| 6,261,193 | B1 | 7/2001 | Sullivan et al. | 473/377 |
| 6,270,429 | B1 | 8/2001 | Sullivan | 473/374 |
| 6,361,453 | B1 | * 3/2002 | Nakamura et al. | 473/371 |

* cited by examiner

*Primary Examiner*—Mark S. Graham  
*Assistant Examiner*—Raeann Gorden  
(74) *Attorney, Agent, or Firm*—Baker Donelson

(57) ABSTRACT

A golf ball (10) is disclosed having a spherical inner core (11), a spherical outer cover (12) spaced from the inner core so as to define a spherical inner cavity (13) therebetween. The inner cavity contains a volume of very fine, granular graphite particles (14). The outer surface of the inner core has a plurality of dimples (18). The outer cover has an inner surface having a plurality of dimples (19) and an outer surface having a plurality of dimples (20).

4 Claims, 1 Drawing Sheet

GOLF BALL

TECHNICAL FIELD

This invention relates to golf balls and specifically to multi-component golf balls.

BACKGROUND OF THE INVENTION

Conventional golf balls can be divided into two general types of balls, a two-piece ball and a three-piece ball. The difference in play characteristics resulting from these different types of balls can be significant.

Two-piece balls are generally more popular with the recreational golfers because they provide a very durable ball while also providing maximum distance. Two-piece balls are made with a single solid core, usually made of a crosslinked rubber, which is encased by a cover material. The combination of the core and cover materials provides a hard ball that is virtually indestructible by golfers. Further, such a combination imparts a high initial velocity to the ball which results in improved distance. However, because these materials are very rigid, two-piece balls have a hard feel when struck with a club.

Three-piece or wound balls are preferred by more advanced players due to their superior feel characteristics. Three-piece balls typically have either a solid rubber or liquid center core around which many yards of a stretched thread or yard are wound. The wound core is then covered with a durable cover material. Three-piece balls are generally softer and provide more spin, which enables a skilled golfer to have more control over the ball's flight. This higher spin characteristic however can be a problem with those who are not advance players as the high side spin rate causes the ball to deviate from a straight path. Furthermore, these higher spinning balls typically have a shorter distance as compared with two-piece balls.

In the past golf balls have been designed which attempt to provide a three-piece ball's feel while simultaneously providing a two-piece ball's distance. U.S. Pat. No. 5,984,805 discloses a golf ball having a solid core surrounded by a cavity and an outer layer. The cavity is filled with a liquid so that the outer layer is separated from the solid core by the layer of liquid. This type of golf ball is designed so that the outer layer moves independently of the core to create a gyro moment. The gyro moment stabilizes the spin rate of the golf ball during flight. However, as the ball is struck with a club the ball is deformed or compressed causing the liquid layer to be squeezed or moved as the outer cover momentarily comes into contact with the inner core. This momentary contact causes the inner core to move or spin in synchronization with the outer layer, thereby defeating the purpose of the disjunction between the inner core and the outer layer.

Accordingly, it is seen that a need remains for a golf ball which has an outer layer which is disjoined from the inner core during all phases of flight. It is to the provision of such therefore that the present invention is primarily directed.

SUMMARY OF THE INVENTION

In a preferred form of the invention a golf ball comprises a spherical core, a spherical cover mounted concentrically about the core so as to define a spherical cavity therebetween, and a layer of unbound, granular particles positioned within the spherical cavity. With this construction, the layer of granular particles provides a disjunctive layer between the core and the cover.

DETAILED DESCRIPTION

Figure 1:
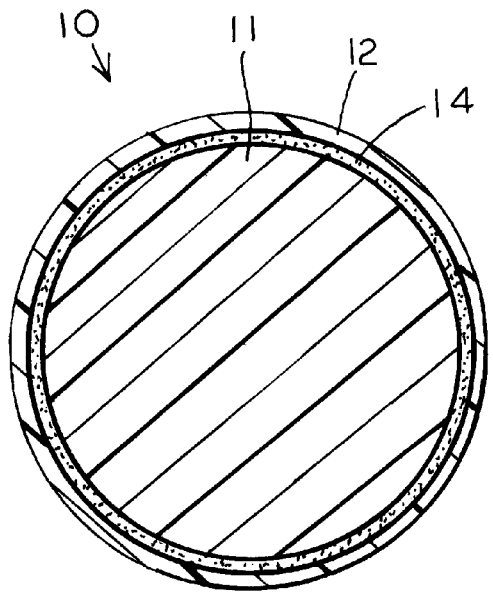
FIG. 1 is a cross-sectional view of a golf ball embodying principles of the invention is a preferred form.
Figure 2:
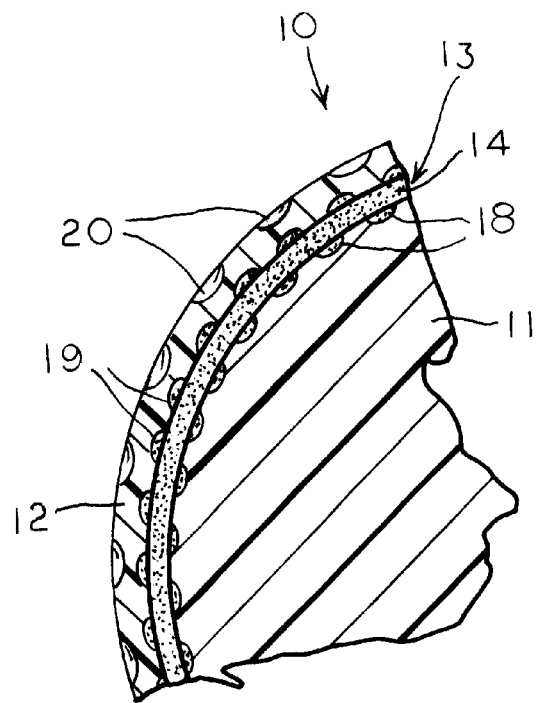
FIG. 2 is detailed, cross-section view of a portion of the golf ball of FIG. 1.

With reference next to the drawings, there is shown a golf ball 10 in a preferred form of the invention. The golf ball 10 has a spherical inner core 11 and a spherical outer cover 12 spaced from and concentrically about the inner core 11 so as to define a spherical inner cavity 13 therebetween. The inner cavity 13 contains a volume of very fine, unbound, granular, graphite particles 14. The outer surface of the inner core 11 has a plurality of dimples 18. The outer cover 12 has an inner surface having a plurality of dimples and an outer surface having a plurality of dimples 20.

The inner core 11 may be made of a polybutadiene which is chemically crosslinked with zinc diacrylate (ZTD) and/or similar crosslinking agents. The inner core 11 may also be made of vulcanized rubber containing polybutadiene rubber, polyisoprene rubber, natural rubber, silicone rubber, or like rubber. The inner core 11 may have a single layer structure or a multi-layer structure having a plurality of layers each made of a different type of material. The inner core 11 has an outside diameter of approximately 34.67 mm, although its diameter may vary depending upon the overall size of the golf ball, the size of the inner cavity 13 or the size of the cover 12.

The outer cover 12 may be made of a material such as SURLYN, which is a trademark for an ionomer resin produced by DuPont. The cover 12 may also be made of an ionomer resin, urethane resin, polyester resin, mixture of urethane resin and polyester resin, or other type of resin. The cover 12 preferably has a thickness of 3 mm, although its thickness may vary depending upon the overall size of the golf ball, the size of the inner core, and the size of the inner cavity. The overall size of the golf ball should conform with the size requirements of the Golf Rules, thus, the golf ball is required to have a diameter of 42.67 mm or more.

The graphite particles 14 preferably have a size of 412 microns. Such graphite particles may be obtained by Superior Graphite Co. of Chicago, Ill.

In use, it is believed that the graphite particles 14 provide a disjunction, disconnection or separation between the inner core 11 and the cover 12 which allows the cover 12 to move independently of the inner core. The inner core dimples 18 and the outer cover inner surface dimples 19 provide additional pockets of graphite particles 14 which aid in insuring an ample supply of graphite particles between the cover and core during compression of the ball as it is struck with a club.

The graphite particles 14 provide a layer of material which is not easily moved or squeezed from between the cover and core during compression of the ball, a problem which existed with a liquid layer of the prior art. Here, the particles 14 remain substantially in the same position during compression and therefore the cover and core do not contact each other during compression. Furthermore, the extremely fine particle size provides an extremely slick lubricating or disconnecting layer between the cover and core which allows them to move independently of the other. As the cover moves independently of the core any spin imparted upon the cover as the ball is struck with the club is restricted from being transferred to the core. As such, the inertia associated with the spinning motion is generally limited to that associated with the cover, as the core remains relatively stable. Of course it is understood that some spinning motion will get transferred to the core due to the friction within the graphite material, between the graphite and the core, and between the graphite and the cover. This spinning of the cover relative to the core also provides a gyroscopic effect upon the golf ball.

The golf ball of the present invention may be manufactured by conventionally forming the core 11, surrounding the core with two hemispherical cups which form the outer cover 12, and vulcanizing the two hemispherical cups so that they become adhered to each other, thereby forming the spherical cavity 13. The cover 11 is then punctured with at least one needle which vacuums the air from within the spherical cavity 13. A second needle then punctures the cover and charges or fills the spherical cavity 13 with a quantity of the graphite particles 14. The puncture holes from the needles are then filled with a sealant.

It should be understood that other types of fine particles which provide a lubricating effect may be used as substitute for the graphite particles described in the preferred embodiment. It should be understood that as used herein the term unbound is meant to define powder wherein the particles that comprise the powder are not bound together. It should also be understood that the ball may be formed without the dimples 18 in the core or the dimples 19 in the inside surface of the cover.

It thus is seen that a golf ball is now provided which overcomes problems with those of the prior art. While this invention has been described in detail with particular references to the preferred embodiments thereof, it should be understood that many modifications, additions and deletions, in addition to those expressly recited, may be made thereto without departure from the spirit and scope of the invention as set forth in the following claims.

What is claimed is:

1. A golf ball comprising a spherical core having an exterior surface having a plurality of dimples thereon, a spherical cover mounted concentrically about said core so as to define a spherical cavity therebetween, and a layer of unbound, granular particles positioned within said spherical cavity, whereby the layer of granular particles provides a disjunctive layer between the core and the cover.

2. The golf ball of claim 1 wherein said granular particles are graphite particles.

3. The golf ball of claim 2 wherein said graphite particles have a granular size of between 4 and 12 microns.

4. A golf ball comprising a spherical core, a spherical cover mounted concentrically about said core so as to define a spherical cavity therebetween, said spherical cover having an interior surface having a plurality of dimples thereon, and a layer of unbound, granular particles positioned within said spherical cavity, whereby the layer of granular particles provides a disjunctive layer between the core and the cover.

* * * * *